United States Patent [19]

Muller, deceased et al.

[11] Patent Number: 5,339,500

[45] Date of Patent: Aug. 23, 1994

[54] HOLDING CLAMP FOR CONNECTING SHEETS HAVING DIFFERENT EXPANSION CHARACTERISTICS

[75] Inventors: Klaus Muller, deceased, late of Weil-Haltingen, Fed. Rep. of Germany, by Herta Muller, Legal representative; Klaus Hullmann, Lorrach, Fed. Rep. of Germany

[73] Assignee: A. Raymond GmbH & Co. KG, Lorrach, Fed. Rep. of Germany

[21] Appl. No.: 111,850

[22] Filed: Aug. 26, 1993

[30] Foreign Application Priority Data

Aug. 27, 1992 [DE] Fed. Rep. of Germany ....... 4228511

[51] Int. Cl.$^5$ ............................................. A44B 21/00
[52] U.S. Cl. ....................................... 24/514; 24/525; 24/569
[58] Field of Search ................... 24/514, 522, 523, 525, 24/535, 569, 543, 490, 335, 72.5, 271; 411/166

[56] References Cited

U.S. PATENT DOCUMENTS

| | | | |
|---|---|---|---|
| 526,490 | 9/1894 | Jessen | 24/72.5 |
| 1,920,899 | 8/1933 | Sullivan | 24/535 |
| 2,058,982 | 10/1936 | Hollingsworth | 24/535 |
| 2,479,634 | 8/1949 | Marques et al. | 24/514 |
| 4,616,384 | 10/1986 | Lowell et al. | 24/525 |

*Primary Examiner*—Victor N. Sakran
*Attorney, Agent, or Firm*—Finnegan, Henderson, Farabow, Garrett & Dunner

[57] ABSTRACT

A holding clamp for connecting together two sheets of material, at least one of which is susceptible to expansion. The clamp has a thread leg having a thread portion for receipt of a threaded member and a pair of clamping legs integrally joined at one end to form a C-shaped structure adapted to receive therebetween a sheet of expandable material, the thread leg being connected to an opposite end of one of the legs of the clamp. Each clamping leg has a through hole in line with the thread portion of the thread leg through which can pass the threaded member and an annular flange around each through hole that extends inwardly from the inner surface of each clamping leg that faces the other clamping leg and toward said other leg, the flanges abutting each other when the two clamping legs are brought together by the threaded member to keep the two legs apart a distance greater than the thickness of the expandable sheet. At least one spring lobe projects inwardly from each clamping leg that engages with opposite side surfaces of the sheet when the flanges abut to hold the clamp against the sheet while permitting it to slide relative to the lobes due to expansion.

4 Claims, 1 Drawing Sheet

HOLDING CLAMP FOR CONNECTING SHEETS HAVING DIFFERENT EXPANSION CHARACTERISTICS

BACKGROUND OF THE INVENTION

This invention relates to a holding clamp for connecting together two sheets of material having different expansion characteristics by means of a screw that can be passed through holes in the sheets and aligned holes in overlapping legs of the clamp.

Connectors of this type are required, for example, in automobile construction to fasten synthetic casings or covers to body parts. The synthetic covers tend to expand more in heat than the body panel, so elongated holes are provided in the synthetic sheets in the direction of expansion. There is a danger here, however, of the screws used with the holding clamps being tightened too strongly. This then results in the synthetic sheet being unable to yield within the clamp so that it tends to arch between its connection points as a result of its expansion.

An object of the present invention, therefore, is to provide a clamp such that, on the one hand, the screw used with the clamp can be tightened strongly enough to achieve a secure clamping, while, on the other hand, the expansion characteristics of one of the sheets clamped by it are not impaired by the screw.

SUMMARY OF THE INVENTION

This object is achieved, in accordance with the present invention, by providing a holding clamp for connecting together two sheets of material, at least one of which is subject to expansion, said clamp comprising a thread leg having a thread portion for receipt of a threaded member, a pair of clamping legs integrally joined at one end of each to form a C-shaped member adapted to receive therebetween a sheet of expandable material, said thread leg being connected to an opposite end of one of said clamping legs, said clamping legs each having a through hole in line with said thread portion through which can pass the threaded member, a flange adjacent at least a portion of each said through hole extending inwardly from the inner surface of each clamping leg that faces the other clamping leg and towards said other leg, said flanges abutting each other when the two clamping legs are brought together by said threaded member to keep the two clamping legs apart a distance greater than the thickness of the sheet of expandable material and at least one spring lobe projecting inwardly from the inner surface of each of said clamping legs that engage with opposite side surfaces of said sheet when said flanges abut to clamp the sheet while permitting the sheet to slide relative to the lobes due to expansion.

The effect of this is that the clamping legs, upon tightening of the screws, are always kept the same distance apart with the spring lobes always acting upon the sheet's surfaces with the same clamping force while permitting its lateral displacement due to expansion.

BRIEF DESCRIPTION OF THE DRAWINGS

An illustrative embodiment of the invention is explained in greater detail below and is shown in the drawings, in which.

DETAILED DESCRIPTION OF THE INVENTION

Figure 1:
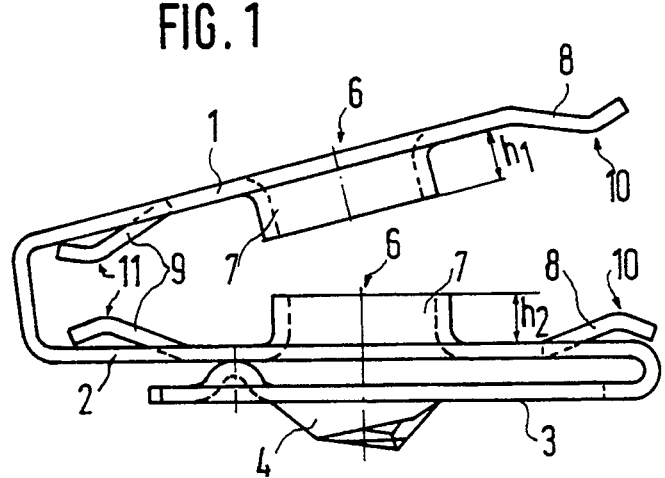
FIG. 1 is a side view of the holding clamp of the invention having two clamping legs and an additional threaded leg.

The holding clamp comprises two clamping legs 1 and 2 forming a C-shaped member for clamping a synthetic sheet 12 of expandable material to a body panel 13 and a threaded leg 3, which has an embossed thread portion 4 adapted to receive a self-tapping screw 5 to be screwed into it.

The two clamping legs 1 and 2 have, aligned with the axis of the embossed thread portion 4, pass-through holes 6 for insertion of screw 5. Coaxially with pass-through holes 6, each clamping leg 1 and 2 has a mutually facing annular flange or hole tube 7, which is deep-drawn out of the rims of the holes and which meet each other in the pressed-together state of the clamping legs. The heights $h_1$ and $h_2$ of the two flanges or tubes 7 are dimensioned such that the total height "$h_1+h_2$" between the pressed-together legs 1 and 2 is greater than the thickness "s" of the synthetic sheet 12 to be held. This, as best shown in FIG. 3, keeps the legs 1 and 2 further apart than the thickness of the sheet 12 when the clamp is in its clamping position.

Clamping legs 1 and 2 engage both sides of synthetic sheet 12 with spring lobes or resilient tabs 8 and 9. The tabs extend inwardly from the legs toward the sheet and then are bent away, at their supporting ends 10 and 11 with a slight, rounded kink. In this way spring lobes 8 and 9 engage with sheet 12 but will not dig into its surface.

Figure 2:
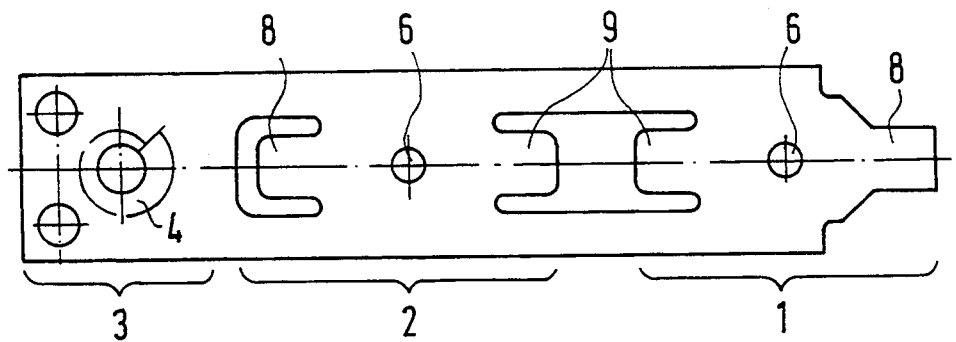
FIG. 2 shows the blank in top view from which the holding clamp of FIG. 1 can be made.

FIG. 2 shows the blank from which the holding clamp can be made. As can be best seen here, each clamping leg 1 and 2 has along its longitudinal axis, on both sides of the pass-through holes 6, two oppositely directed spring lobes 8 and 9. These spring lobes 8 and 9 are punched out and formed from the central region of the clamping legs 1 and 2, so that the spring lobes 8 and 9 can be made in a material-saving manner.

Figure 3:
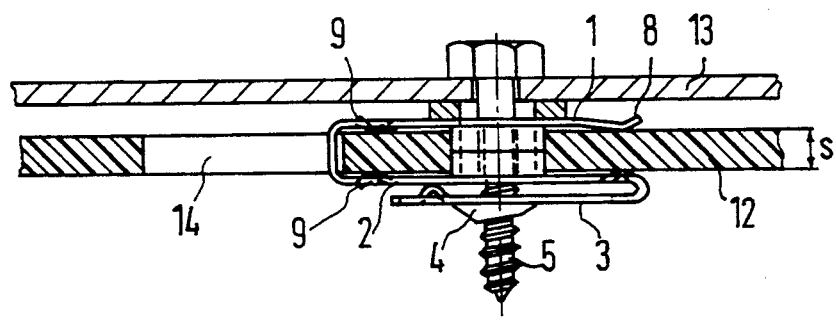
FIG. 3 shows the holding clamp in its clamping position.

In FIG. 3, the holding clamp is shown in its clamping position. The clamp here has been introduced through an assembly recess 14 in synthetic sheet 12 until the annular flanges 7 are opposite from and can be pressed into a hole provided for this purpose, in synthetic sheet 12. The synthetic sheet 12 is then fastened with the holding clamp to the body panel 13, by passing a screw 5 from the body panel side through the holes 6 of the two legs and into the embossed thread portion 4 of thread leg 3 until the two flanges 7 firmly abut against each other. At this point spring lobes 8 and 9 are spread outwards somewhat and pressed against opposite side surfaces sheet 12, with a defined, constant clamping force. As a result, the sheet is tightly clamped with respect to panel 13, but at the same time it can move laterally in the plane of the sheet if necessary as a result of expansion.

What is claimed is:

1. A holding clamp for connecting together two sheets of material, at least one of which is subject to expansion, said clamp comprising a thread leg having a thread portion for receipt of a threaded member, a pair of clamping legs integrally joined at one end of each to form a C-shaped member adapted to receive therebetween a sheet of expandable material, said thread leg being connected to an opposite end of one of said clamping legs, said clamping legs each having a through hole in line with said thread portion of the thread leg through which can pass the threaded member, a flange adjacent at least a portion of each said through hole extending inwardly from the inner surface each clamping leg that faces the other clamping leg and towards said other leg, said flanges abutting each other when the two clamping legs are brought together by said threaded member to keep the two clamping legs apart a distance greater than the thickness of the sheet of expandable material and at least one spring lobe projecting inwardly from the inner surface of each of said clamping legs that engage with opposite side surfaces of said sheet when said flanges abut to clamp the sheet while permitting the sheet to slide relative to the lobes due to expansion.

2. The holding clamp of claim 1, wherein said flanges are annular flanges that extend around the perimeter of the through hole in each clamping leg.

3. The holding clamp of claim 1, wherein each spring lobe is a resilient tab having a first leg that projects inwardly from the inner surface of each clamping leg at an angle toward the other clamping leg and then a second leg that bends away from said other leg, the joint between the two legs of the tab having a rounded surface that engages with a side surface of the sheet of expandable material.

4. The holding clamp of claim 3, including a pair of oppositely directed resilient tabs on opposite sides of the through hole of each clamping leg.

* * * * *

UNITED STATES PATENT AND TRADEMARK OFFICE
CERTIFICATE OF CORRECTION

PATENT NO. : 5,339,500
DATED : August 23, 1994
INVENTOR(S) : Klaus Muller et al.

It is certified that error appears in the above-indentified patent and that said Letters Patent is hereby corrected as shown below:

Claim 1, column 3, line 8, after "surface" insert --of--.

Signed and Sealed this

Twenty-seventh Day of December, 1994

BRUCE LEHMAN

Attest:

Attesting Officer

Commissioner of Patents and Trademarks